Feb. 21, 1956 C. E. MISCH 2,735,583
MATERIALS DISPENSING DEVICE
Filed Dec. 8, 1950 3 Sheets-Sheet 1
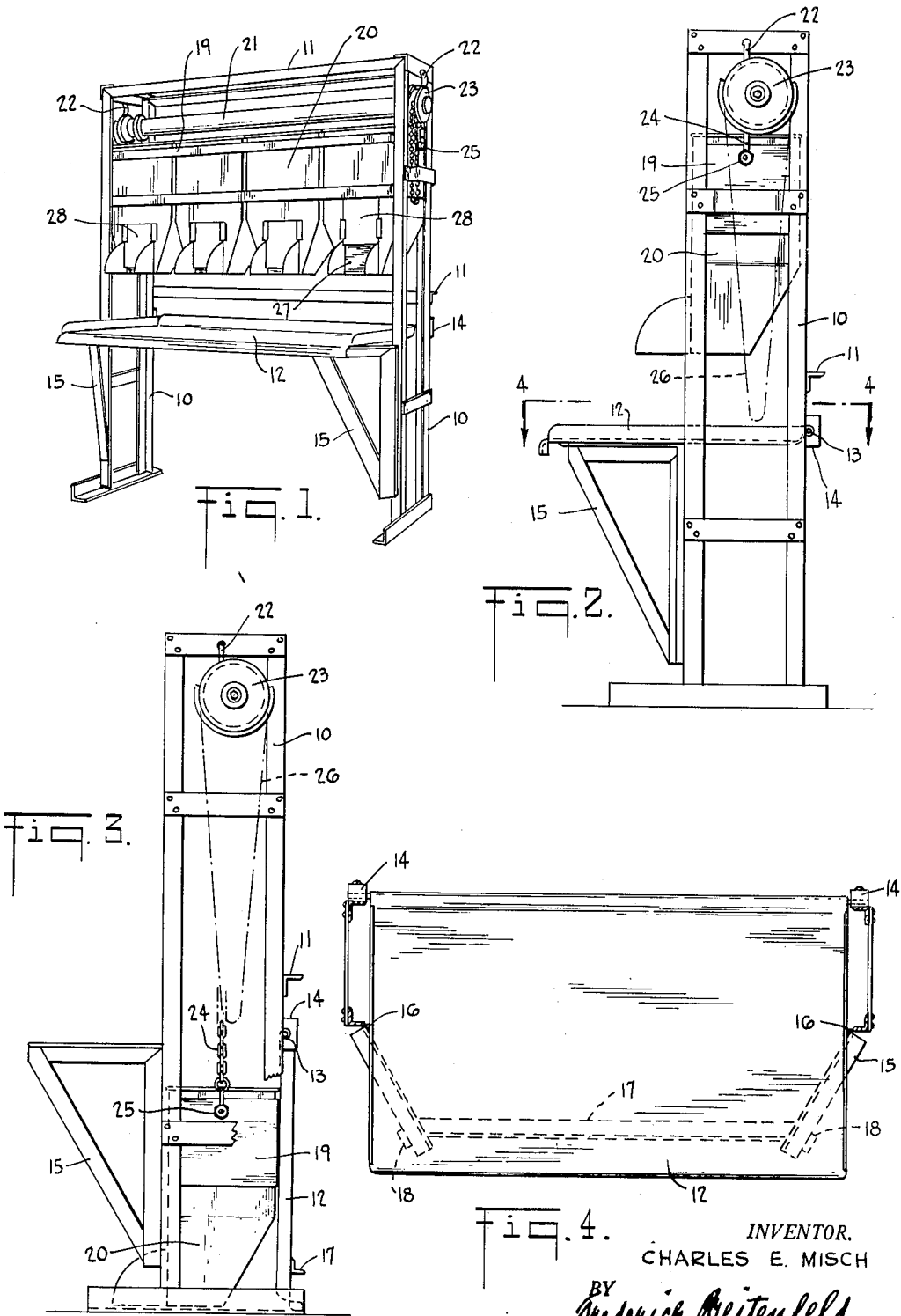
INVENTOR.
CHARLES E. MISCH
BY Frederick Reitenfeld
ATTORNEY Feb. 21, 1956
C. E. MISCH
2,735,583
MATERIALS DISPENSING DEVICE
Filed Dec. 8, 1950
3 Sheets-Sheet 2
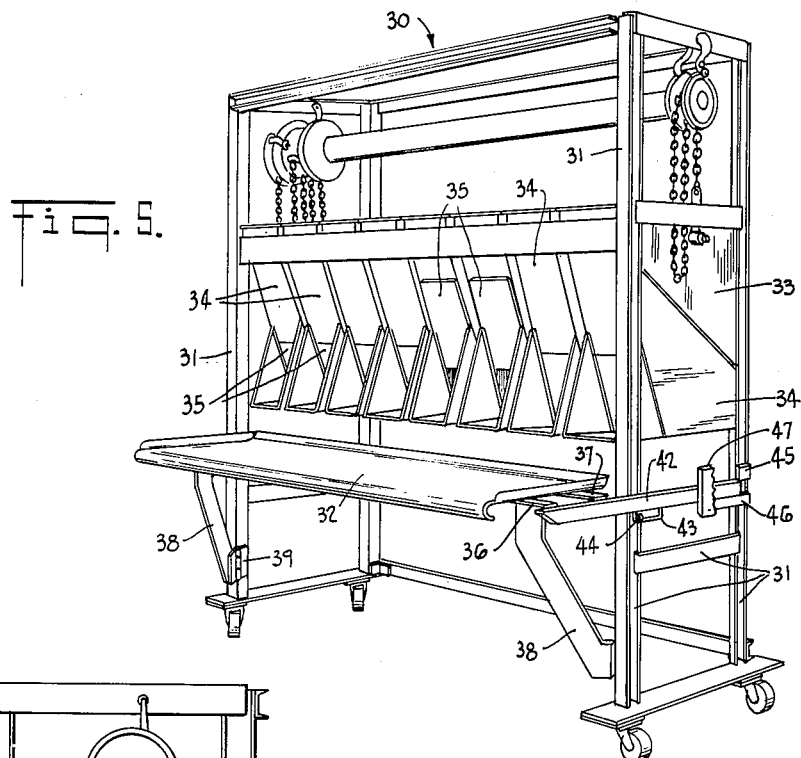
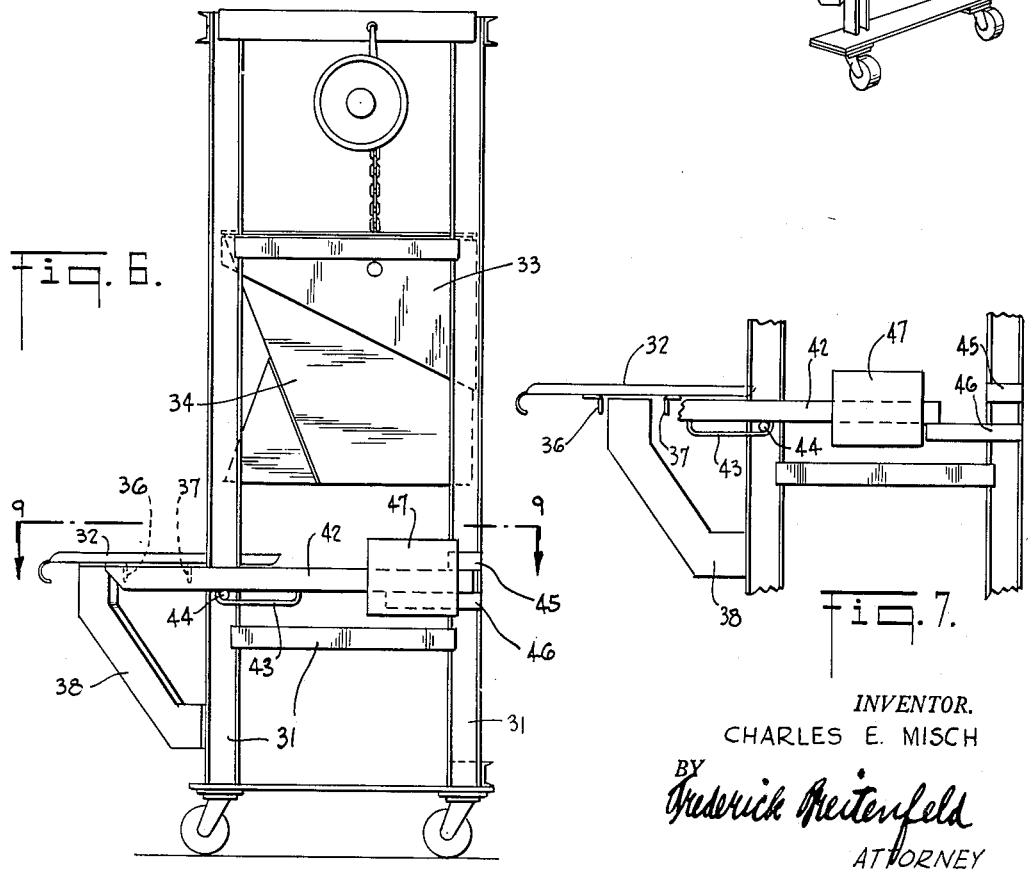
INVENTOR.
CHARLES E. MISCH
BY
Frederick Reitenfeld
ATTORNEY Feb. 21, 1956   C. E. MISCH   2,735,583
MATERIALS DISPENSING DEVICE
Filed Dec. 8, 1950   3 Sheets-Sheet 3

INVENTOR.
CHARLES E. MISCH
BY Frederick Breitenfeld
ATTORNEY

United States Patent Office 2,735,583
Patented Feb. 21, 1956

2,735,583

MATERIALS DISPENSING DEVICE

Charles E. Misch, New York, N. Y.

Application December 8, 1950, Serial No. 199,748

8 Claims. (Cl. 222—129)

My present invention relates generally to containers for solid materials, and has particular reference to a novel assemblage of bins from which the contents can be expeditiously dispensed onto a work table.

The invention is primarily intended for use in bakeries, especially cake or bread shops, and the bins are designed to hold and dispense a plurality of different dry ingredients which enter into the cake or other product which is to be baked. Such materials may consist, for example, of sugar, salt, baking powder, flour, cocoa, powdered milk, raisins, and the like.

The use of ordinary ingredient bins is beset with a number of problems. When they are of the type which stands on the floor, and access to them is from the top, it is impossible to use the ingredients on a first-in first-out basis, and any materials that accumulate on the bottom are not only wasted but become a source of unsanitary conditions. On the other hand, where bins are permanently mounted in an elevated position so that the contents can be withdrawn from the bottom when needed, it becomes a problem to refill the bins, especially by means of existing sanitary sifting devices.

It is a general object of the present invention to obviate these difficulties, and to provide an ingredient dispenser which not only operates on the desirable first-in first-out basis, but which is economical to use, easy to clean and to retain in a sanitary condition, and convenient for withdrawal of contents and also for refilling.

In accordance with my invention, I combine in a unique and entirely practical fashion a plurality of ingredient bins which can be raised and lowered as a unit, and a work table that can be positioned beneath the bins when they are elevated and moved out of the way when they are lowered. Each bin is provided with a filling opening at the top and an outlet opening at the bottom. The bins are normally in a raised relation to the table whereby the contents can be withdrawn in convenient fashion and deposited directly upon the table. A means is provided so that when refilling is called for the table can be swung out of the path of movement of the bins, and the bins lowered to an extent sufficient to make the top openings conveniently accessible to receive new charges of materials. The device is so designed that when the bins are lowered the table is sufficiently out of the way to permit supply carts and sifters of well-known character to be wheeled closely adjacent to the bins. For cleaning purposes the bins can be separately withdrawn from the apparatus and individually handled.

In the accompanying drawings I have illustrated two embodiments of the invention, showing how the foregoing general objects and advantages can be achieved in a practical manner. In the drawings:

Figure 1 is a perspective view of a device employing four bins;

Figure 2 is a side elevational view;

Figure 3 is a view similar to Fig. 2, with parts broken away, and with the bins in their lowered position;

Figure 4 is a cross-sectional plan view taken substantially along the line 4—4 of Fig. 2;

Figure 5 is a perspective view of a device of slightly modified character, employing eight bins;

Figure 6 is a side elevational view of the device shown in Fig. 5;

Figure 7 is a fragmentary side view showing certain of the parts of Fig. 6 in partially adjusted relationship;

Figure 9:
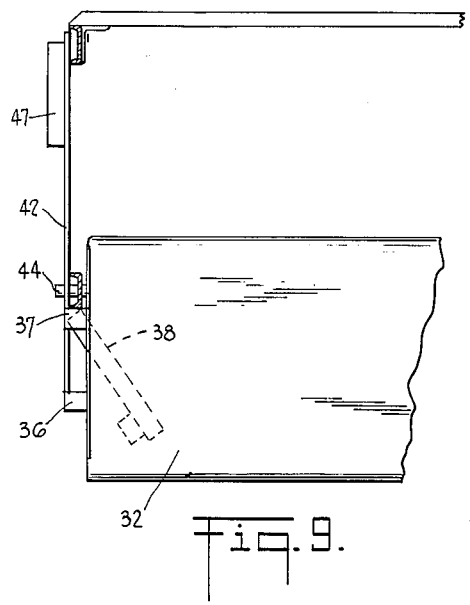
Figure 9 is a fragmentary cross-sectional plan view taken substantially along line 9—9 of Fig. 6.
Figure 11:
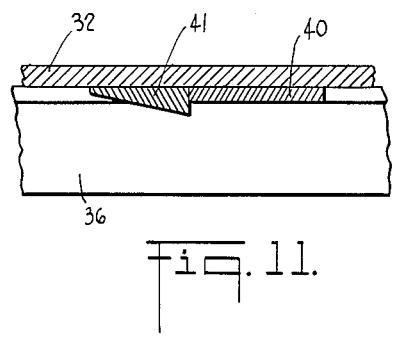
Figure 11 is an enlarged cross-sectional view taken substantially along the line 11—11 of Fig. 10.
Figure 10:
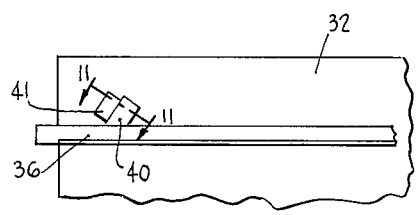
Figure 10 is a fragmentary detail view of the under side of the table shown in Fig. 9.

The device is substantially rectangular in design having two spaced uprights or frame members 10 connected by longitudinal members 11. The frame members may be of any suitable material and shape, such as metallic angles, channels, bars or the like. The frame may be furnished at the bottom with casters (Fig. 5) but this is not essential. If casters are used, any well-known locking means (not shown) may also be provided to secure the frame against movement once it has been rolled into a desired location.

In the embodiment illustrated in Figs. 1–4, a work table 12 extends between the uprights 10 and is pivotally connected to them at the rear. This may be achieved by aligned pivots 13 provided at opposite ends of the table 12 and mounted in suitable bearings 14 carried by the frame uprights 10. The pivots are at an elevation from the floor which is at least as great as the depth of the table 12 from front to back, whereby it is possible for the table to be swung downwardly and rearwardly from the operative horizontal position shown in Figs. 1, 2 and 4 to the inoperative vertical position shown in Fig. 3.

In its horizontal position, the table 12 is supported by braces 15 hinged to the front parts of the uprights 10, as indicated at 16 in Fig. 4. When swung into forwardly converging relation, the braces 15 lie beneath the end regions of the table 12, as indicated in Fig. 4; and when the braces 15 are swung outwardly they permit the table to be lowered. If desired, the underside of the table may be rigidified by an angle 17 terminating in beveled ends which afford abutments for the braces 15 when the latter are swung into the supporting positions shown in Fig. 4. Also, to prevent accidental displacement of the braces 15, the table may be provided on its under side with small wedge-shaped plates 18 behind which the braces 15 become locked and from which they can be released only by a deliberate lifting force exerted upon the table.

Mounted in the frame between the uprights 10, for up and down movement, is a bin carriage 19 formed of metallic strips defining a front, a back, end walls, and a series of parallel partitions extending from front to back. The walls of the carriage 19, and the partitions, define rectangular openings in which individual bins 20 are mounted, the bins being removably insertable into the carriage in a downward direction and being supported in the carriage in some suitable manner, e. g., by forming a projecting bead along the upper margin of each bin adapted to rest on the upper edge portion of the carriage.

The carriage 19 is guided in its up and down movements by the corner pieces of the supporting frame, or by special guide rails or their equivalent which may be provided for this purpose if desired. The raising and lowering of the carriage 19, and of the bins 20 carried by it, is preferably accomplished by a two-hook chain hoist of well-known character consisting of the longitudinal housing 21, the hooks 22 securing it to the upper cross-bars of the uprights 10, the sheaves 23, and the chains 24 leading downwardly from these sheaves to anchorages 25 which secure the chains to the opposite end pieces of the carriage 19. The hoist comprises also the well-known actuating chain loop 26, indicated by dot-and-dash lines in Figs. 2 and 3, by means of which the up and down movements of the carriage 19 are controlled.

Preferably the frame is provided with pins or other removable or adjustable supports (not shown) to which the weight of the carriage and bins may be shifted after they have been raised, so that the pull of this weight is not continuously imposed upon the chains and the chain hoist.

In the device illustrated in Figs. 1–4, the carriage 19 is adapted to accommodate four ingredient bins. These bins may be composed of any suitable material, although stainless steel has been found to be most desirable from the standpoint of strength, sanitation and appearance. Each bin is substantially rectangular in horizontal cross-section, having an outlet opening in the bottom of its front wall and an inlet opening in the top wall. The outlet opening is indicated in Fig. 1 at 27 and may be closed by a sliding door 28. In Fig. 1 the three doors 28 at the left are closed, while the one at the right is open. Each opening 27 is preferably surrounded by a forwardly projecting scooplike formation, as shown, to facilitate the withdrawal of material.

The closure at the top of each bin may be of any suitable hinged or removable kind, the details of which have not been illustrated.

With the bins elevated as shown in Figs. 1 and 2, and the work table 12 supported in its horizontal position, the baker has ready access to the materials in the bins and can draw off desired quantities directly onto the table 12. The materials are drawn from the bottoms of the bins and since the filling is from the top it follows that the desirable and economical first-in first-out system may be adhered to.

When refilling becomes necessary, the braces 15 are swung aside, the table is lowered into the inoperative position shown in Fig. 3, where it is out of the path of movement of the bins and bin carriage, and the chain hoist is then operated to lower the bins. Preferably a suitable abutment (not shown) is provided on the frame near the floor to stop the downward movement of the bin carriage before the bins themselves actually touch the floor. Supply carts and sifters of the type currently in use are then rolled directly into close proximity to the bins, and when the top bin closures have been swung open or removed, fresh charges of clean sifted materials can be fed into the respective bins. They are then closed again and raised to elevated position, and the table can then be swung upwardly again and braced in its working position.

Obviously it is a relatively simple matter to clean the floor beneath the device, after the filling operation or during other periods of use. As a result of this the use of the present device contributes materially to the maintenance of sanitary conditions. The cleaning of the bins themselves at periodic intervals can be accomplished through their inlet and outlet openings. This may be done while the bins are in lowered position, or they may first be removed individually from the bin carriage.

The embodiment of the invention shown in Figs. 5–11 is substantially the same in general purpose and design, but illustrates some modifications which may be desirable under certain circumstances, especially with respect to the support and adjustability of the work table. In the device shown in Figs. 5–11, the bins are eight in number. In order to keep the over-all length of the device to a minimum the bins are deeper, from front to back, than those shown in Figs. 1–4. This makes it unfeasible to hinge the table at the rear. Instead, the table is mounted for adjustment forwardly and downwardly in a unique manner.

The frame of the device is substantially rectangular, as in Figs. 1–4, and is designated by the reference numeral 30. It includes spaced uprights 31. A work table 32 extends between these uprights, as well as a bin carriage 33 supporting the eight bins 34 in side-by-side relation. The bin carriage and bins are raised and lowered by a two-hook chain hoist of the known character hereinbefore referred to. Each bin 34 has a top filling opening with a removable or pivotable cover and an outlet opening in its front wall, the latter being preferably closed by a slidable door 35 or its equivalent.

Figure 8:
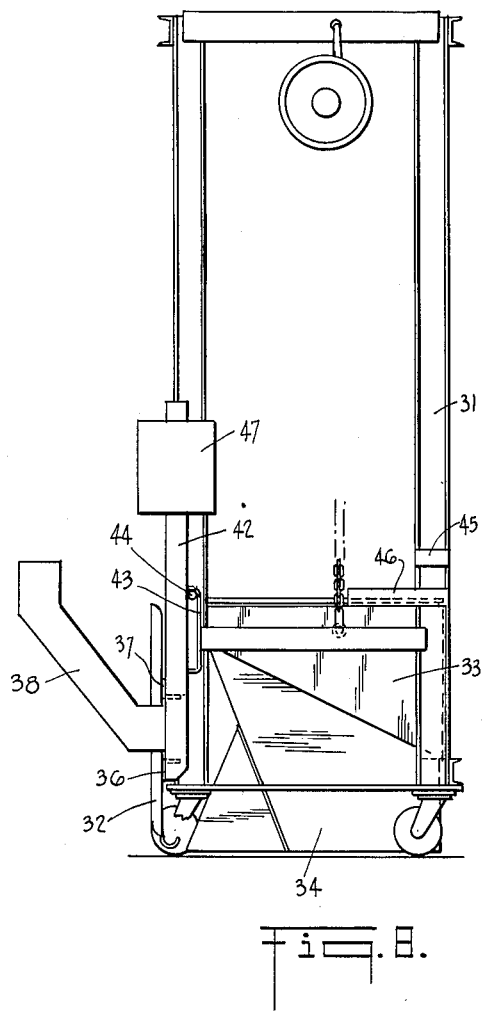
Figure 8 is a view similar to Fig. 6 showing the bins in their lowered position.

The table 32, in its operative horizontal position, does not extend all the way to the rear of the device, but assumes the position shown in Fig. 6. It is stiffened on its under side by a pair of parallel angles 36 and 37. These angles project sideways beyond the side edges of the table (Figs. 5, 9 and 10) but in each case the perpendicular flange of the angle is cut off in the region beyond the table. Braces 38 are hinged, as at 39, to the front parts of the uprights 31, but each brace is in this case an element of substantially uniform cross-section throughout its extent, as best shown in Fig. 8. Each brace projects forwardly and upwardly at an angle of about 45°. When these braces are swung toward each other, their upper ends encounter the vertical flange of the angle 36 and lie beneath the horizontal flange of the angle 36. To afford a seating area of greater extent, flat elements 40 may be secured to the under side of the table. Adjacent to each of these elements 40 is a wedge-shaped element 41 similar to that indicated at 18 in Fig. 4 whereby a release of the braces 38 requires that a deliberate upward lifting force be applied to the table 32.

Secured to each pair of outer ends of the stiffening members 36 and 37 is a rearwardly extending bar 42 (Figs. 5, 6 and 7). This bar carries a U-shaped loop 43 at its bottom edge, thus defining a sort of slot with which a pivot pin 44 engages, this pin being carried by the front part of the corresponding upright 31.

When the table 32 is in its rearmost position, as shown in Figs. 5 and 6, the rear end engages beneath an abutment block 45 carried by the rear part of the upright 31. A fixed bar 46, spaced beneath the block 45, helps to guide the rear end of the bar 42 into the position shown in Figs. 5 and 6, in which the table is locked against tilting. A counterweight 47 carried by the bar 42 may be used to advantage, but is not essential.

With the bins raised and the table 32 in the position shown in Figs. 5, 6 and 9, the baker has before him an array of ingredient bins from which he may select desired materials with which to perform his mixing operation. When the bins are to be lowered for refilling, the braces 38 are first swung outwardly and the table 32 is then pulled forwardly from the position of Fig. 6 to that of Fig. 7. This not only releases the rear end of each of the bars 42 but brings each pin 44 into the rear end of the slot in which it is mounted. The parts are so designed that in this position each pair of projecting ends of the stiffening bars 36 and 37 is disposed with the upper end of the corresponding brace 38 in a position exactly between them (Fig. 7). Accordingly, the table may now be lowered into the position shown in Fig. 8, each pair of projecting bars 36 and 37 remaining on opposite sides of the corresponding brace 38 during this swinging movement.

After lowering of the table, as described and as indicated in Fig. 8, the bins may be lowered, and loading carts and sifters may then be rolled to them. (The table 32 in its inoperative position lies directly in front of the bins and does not prevent the supply cart from approaching to the necessary extent.) Refilling of the bins is accomplished as hereinbefore described, the top closure of each bin being first lifted or removed and then ultimately replaced.

To restore the parts to working positions, the chain hoist is operated to raise the bin carriage and bins, the entire carriage is then blocked up by pins or other media (not shown) to shift the weight from the chain hoist, and the table is adjusted back to its operative position. The table adjustment involves lifting it forwardly to horizontal position until the ends of the bars 36 and 37 clear the upper ends of the braces 38, then shoving it rearwardly to lock the rear ends of the bars 42 beneath the corresponding abutments 45, and finally swinging the braces 38 toward each other until they latch themselves behind the elements 41.

While the invention is obviously not restricted to any particular sizes or dimensions, it has been found in practice that bins having a capacity from about two to ten cubic feet are most satisfactory. The number of bins may be varied to suit different requirements, and the individual dimensions and shapes of the bins may also be different from those herein illustrated. The structure shown in Figs. 5-8 was employed satisfactorily for bakery purposes with an individual bin capacity of four cubic feet, the overall dimensions of the entire structure being 8 feet in height, 7½ feet in length, and 5 feet in depth from front to back.

In general, it will be understood that those skilled in the art may make numerous changes in the details herein illustrated and described without necessarily departing from the spirit and scope of the invention as expressed in the appended claims.

Having thus described and illustrated my invention, what I desire to secure by grant of Letters Patent is:

1. In an ingredient dispenser, a supporting frame comprising spaced parallel uprights, a set of bins arranged side by side in the space between said uprights, each bin having an upper filling opening and a lower outlet opening, means for mounting said bins for linear up and down movement as a unit with respect to said frame, a work table extending between said uprights, and means for pivotally supporting said table on said frame, said means being so constructed and arranged that the table may be moved between an operative horizontal position underlying said bins when the latter are raised and an inoperative vertical position out of the path of movement of said bins when the latter are to be lowered for filling thereof, said table supporting means including means for supporting the table in its horizontal operative position below the bins and between the frame uprights and in the path of up and down movement of the bins.

2. In an ingredient dispenser, the combination of elements set forth in claim 1, said table supporting means comprising pivots securing said table near its rear edge to the rear parts of said uprights at a height at least equal to the width of the table from front to back, and swinging braces carried by the forward parts of said uprights for movement into and out of positions beneath the table when the latter is in its horizontal position.

3. In an ingredient dispenser, the combination of elements set forth in claim 1, said table supporting means comprising interengaging members affording a horizontally shiftable pivot connection between the end edges of the table and the corresponding uprights, whereby the table may be shifted forwardly, prior to pivoting thereof, out of its operative position to withdraw its rear margin from the path of up and down movement of said bins.

4. In an ingredient dispenser, the combination of elements set forth in claim 1, said table supporting means comprising interengaging members affording a horizontally shiftable pivot connection between the end edges of the table and the corresponding uprights, one of said members being a pin, the other being shaped to define an elongated slot into which the pin extends, whereby the table may be shifted forwardly, prior to pivoting thereof out of its operative position, to withdraw its rear margin from the path of up and down movement of said bins.

5. In an ingredient dispenser, the combination of elements set forth in claim 1, said table supporting means comprising interengaging members affording a horizontally shiftable pivot connection between the end edges of the table and the corresponding uprights, one of said members being a pin, the other being shaped to define an elongated slot into which the pin extends, whereby the table may be shifted forwardly prior to pivoting thereof out of its operative position, to withdraw its rear margin from the path of up and down movement of said bins, a rearwardly extending locking element carried by at least one end edge of the table, and an abutment carried by the corresponding upright of the frame beneath which said element positions itself when the table is in operative position.

6. In an ingredient dispenser: a supporting frame; a bin carriage substantially coextensive in width with the width of said frame; means mounting said carriage on said frame for up and down linear movement with respect thereto; and a series of individual bins removably secured to the carriage in horizontally aligned side by side relation, each bin having an upper filling opening and a lower outlet opening.

7. In an ingredient dispenser, the combination with the structure defined in claim 6, of a work table, and means for adjustably supporting said table on said frame in such a way that the table may be adjusted between (a) an operative horizontal position lying across the path of movement of said carriage and directly beneath said outlet openings when the carriage is raised and (b) an inoperative vertical position lying alongside said path of movement so that the bin carriage may be lowered to bring said filling openings to correspondingly lowered positions.

8. In an ingredient dispenser: a supporting frame; a bin carriage comprising a front, a back, end walls, and a series of partitions parallel to the end walls; individual bins removably secured to the carriage within the openings defined by said partitions, each bin having an upper filling opening and a lower outlet opening; and means for mounting the bin carriage on said frame for up and down linear movement of the carriage and bins as a unit with respect to the frame.

References Cited in the file of this patent

UNITED STATES PATENTS

| | | |
|---|---|---|
| 171,683 | Miller | Jan. 4, 1876 |
| 294,907 | Perry | Mar. 11, 1884 |
| 350,997 | Sanders | Oct. 19, 1886 |
| 527,629 | Traut | Oct. 16, 1894 |
| 529,528 | Goff | Nov. 20, 1894 |
| 540,315 | Ingersoll | June 4, 1895 |
| 582,697 | Schneider | May 18, 1897 |
| 1,419,278 | Ludwig | June 13, 1922 |
| 1,425,259 | Howe | Aug. 8, 1922 |
| 1,698,981 | Ackerman | Jan. 15, 1929 |
| 1,733,577 | Burke | Oct. 29, 1929 |
| 2,062,452 | Gluckstein | Dec. 1, 1936 |